US005893448A

United States Patent [19]

Miyamoto et al.

[11] Patent Number: 5,893,448

[45] Date of Patent: Apr. 13, 1999

[54] ADAPTER FEEDING APPARATUS

[75] Inventors: Takayuki Miyamoto; Takao Fuyushiba; Hiroyuki Watanabe, all of Yokkaichi; Toshiaki Katoh, Matsuzaka; Katsuya Yamanaka, Matsuzaka; Kazuyuki Suzuki, Matsuzaka, all of Japan

[73] Assignee: Sumitomo Wiring Systems, Ltd., Japan

[21] Appl. No.: 08/711,808

[22] Filed: Sep. 10, 1996

[30] Foreign Application Priority Data

Sep. 11, 1995 [JP] Japan .................................... 7-232477

[51] Int. Cl.⁶ .................................................... B65G 47/24

[52] U.S. Cl. ........................................ 198/389; 198/397.03

[58] Field of Search ............................... 198/389, 397.03, 198/786; 221/156

[56] References Cited

U.S. PATENT DOCUMENTS

| | | | |
|---|---|---|---|
| 2,615,556 | 10/1952 | Hoopes et al. | 198/389 |
| 3,297,131 | 1/1967 | Pawlowski | 198/389 |
| 3,552,539 | 1/1971 | Rutter | 221/156 |
| 4,449,883 | 5/1984 | Kampfmann . | |
| 4,763,400 | 8/1988 | Deckers . | |
| 5,333,717 | 8/1994 | Rosenberg et al. | 198/389 |

*Primary Examiner*—Joseph E. Valenza
*Attorney, Agent, or Firm*—Jordan B. Bierman; Bierman, Muserlian and Lucas

[57] ABSTRACT

An adapter feeding apparatus which is capable of feeding adapters (1) in a predetermined position to the next process step at a stable and constant pace is disclosed. The adapter feeding apparatus includes a hopper portion for receiving the adapters (1), a guide passage portion for guiding the adapters (1) from the hopper portion into a drum element, an adapter delivery mechanism for delivering the adapters (1) one by one, an adapter transport mechanism (15) having a pair of guide rails (44) downwardly inclined in a transport direction (P) and spaced to inhibit the passage of a positioning rib (20) therethrough, the adapter transport mechanism (15) for rotating the guide rails (44) upwardly outwardly, a chute portion (16) for guiding the adapters (1) from the adapter delivery mechanism to the spacing between the guide rails (44) upstream of the transport direction (P) of the adapter transport mechanism (15), and an adapter extraction and supply mechanism (17) for extracting the adapters (1) sequentially transported downstream of the transport direction (P) of the guide rails (44) one by one to feed the adapters to the next process step.

6 Claims, 7 Drawing Sheets

ADAPTER FEEDING APPARATUS

BACKGROUND OF THE INVENTION

1. Field of the Invention

The present invention relates to an adapter feeding apparatus for sequentially feeding adapters in assembling plug joints connected to an engine direct-coupled coil of an ignition coil system for an internal combustion engine of an automotive vehicle for electrical connection to a spark plug.

2. Description of the Background Art

Conventionally, this type of plug joint includes a tubular adapter 1 made of PBT (polybutylene terephthalate) and the like, as illustrated in FIGS. 6 and 7. The adapter 1 comprises an adapter body 1*a*, a bushing mounting portion 1*b* formed on a first end of the adapter body 1*a* and to which is mounted a bushing element 2 made of silicone rubber and the like for connection to a spark plug, and a cap mounting portion 1*c* formed on a second end of the adapter body 1*a* and to which is mounted a cap element 3 made of silicone rubber and the like for connection to an ignition coil and for contact with an outer peripheral surface of a periphery of a plug hole in a cylinder head.

The bushing element 2 is bonded to the bushing mounting portion 1*b* of the adapter 1 with an adhesive, and the cap element 3 is bonded to the cap mounting portion 1*c* with an adhesive for assembly of a plug joint 5.

However, the plug joint 5 has been assembled in such a manner that an operator manually supplies the adapter 1 in a predetermined position to an adapter holding and rotating mechanism for holding and rotating the adapter 1, applies an adhesive, for example, to an outer peripheral surface of the bushing mounting portion 1*b* of the adapter 1 being rotated by the adapter holding and rotating mechanism by using a brush, and then mounting the bushing element 2 on the bushing mounting portion 1 to bond the bushing element 2 to the bushing mounting portion 1*b*.

Likewise, the operator applies the adhesive to the cap mounting portion 1*c* and then mounts the cap element 3 on the cap mounting portion 1*c* to bond the cap element 3 to the cap mounting portion 1*c*.

Thus, the operator manually supplies the adapters 1 to the adapter holding and rotating mechanism, resulting in variations in adapter feeding paces.

Additionally, the feed of the adapters 1 depends upon operator's skill. A resemblance in configuration between the bushing mounting portion 1*b* and cap mounting portion 1*c* of the adapter 1 might cause the operator to make the mistake of feeding the adapter 1 in an improper orientation due to operator fatigue, resulting in low reliability.

SUMMARY OF THE INVENTION

A first aspect of the present invention is intended for an adapter feeding apparatus for sequentially feeding tubular adapters to a next process step, each of the adapters including at its first end a bushing mounting portion to which a bushing element is mounted, and at its second end a cap mounting portion to which a cap element is mounted, one of the bushing mounting portion and the cap mounting portion including a large-diameter locking portion having a diameter greater than that of other portions of the adapters. According to the present invention, the adapter feeding apparatus comprises: a hopper portion for receiving the adapters; an adapter delivery mechanism having a drum element supported for rotation about a horizontal axis, the adapter delivery mechanism for delivering the adapters in the drum element one by one by the rotation of the drum element; a guide passage portion for guiding the adapters received in the hopper portion into the drum element; an adapter transport mechanism including a pair of guide rails having a circular outer peripheral surface and inclined downwardly in a transport direction, the guide rails being spaced to inhibit the passage of the large-diameter locking portion therethrough, and a driving portion for rotating the pair of guide rails upwardly outwardly about their axes; a chute portion for guiding the adapters delivered from the adapter delivery mechanism to the spacing between the pair of guide rails upstream of the transport direction of the adapter transport mechanism; and an adapter extraction and supply mechanism provided downstream of the transport direction of the guide rails for extracting the adapters sequentially transported, with the large-diameter locking portion of each of the adapters locked in the spacing between the guide rails, one by one to feed the adapters to the next process step.

Preferably, according to a second aspect of the present invention, the drum element includes a scoop-up portion formed on an inner peripheral surface of the drum element for scooping up a single one of the adapters when the drum element rotates about its axis to permit the single adapter to fall by gravity at an upper position, and the adapter feeding apparatus further comprises: a transport conveyor for receiving the fallen adapter to feed the fallen adapter to the chute portion.

Preferably, according to a third aspect of the present invention, the scoop-up portion includes a scoop-up tool of an L-shaped cross-sectional configuration mounted on the inner peripheral surface of the drum element to define an adapter retaining groove elongated in the axial direction of the drum element for receiving and holding the single adapter.

Preferably, according to a fourth aspect of the present invention, the transport conveyor includes a guide portion for guiding the adapter fallen from the scoop-up portion onto a conveyor belt of the transport conveyor.

Preferably, according to a fifth aspect of the present invention, the adapter feeding apparatus further comprises a feed amount adjusting mechanism provided at a location in a lower surface of the guide passage portion for adjusting the amount of the adapters to be fed into the drum element.

In accordance with the adapter feeding apparatus of the first aspect of the present invention, as above described, the adapter transport mechanism automatically orients the adapters into a predetermined vertical position independently of the orientation of the adapters delivered from the adapter delivery mechanism. The adapter extraction and supply mechanism sequentially extracts the adapters oriented in the predetermined vertical position to automatically supply the adapters to the next process step. This allows the adapters to be fed in the predetermined position to the next process step at a stable and constant pace without operators.

The adapter delivery mechanism delivers the adapters one by one to the chute portion, effectively preventing the adapters from being jammed upstream of the transport direction of the guide rails.

The guide rails are rotated upwardly outwardly to effectively prevent a stream of adapters from being jammed due to the resistance of the adapters and also to effectively prevent the large-diameter locking portion from being caught between the guide rails and damaged.

In accordance with the adapter feeding apparatus of the fourth aspect of the present invention, the transport conveyor includes the guide portion for guiding the adapter fallen by gravity from the scoop-up portion onto the conveyor belt of the transport conveyor. This permits satisfactory guidance of the adapters fallen from the scoop-up portion onto the conveyor belt, stabilizing the delivery of the adapters by the transport conveyor.

In accordance with the adapter feeding apparatus of the fifth aspect of the present invention, the feed amount adjusting mechanism provided at a location in the guide passage portion for adjusting the amount of adapters to be fed into the drum element is advantageous in effectively preventing overload when the drum element rotates.

It is therefore an object of the present invention to provide an adapter feeding apparatus which is capable of feeding adapters in a predetermined position to the next process step at a stable and constant pace.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
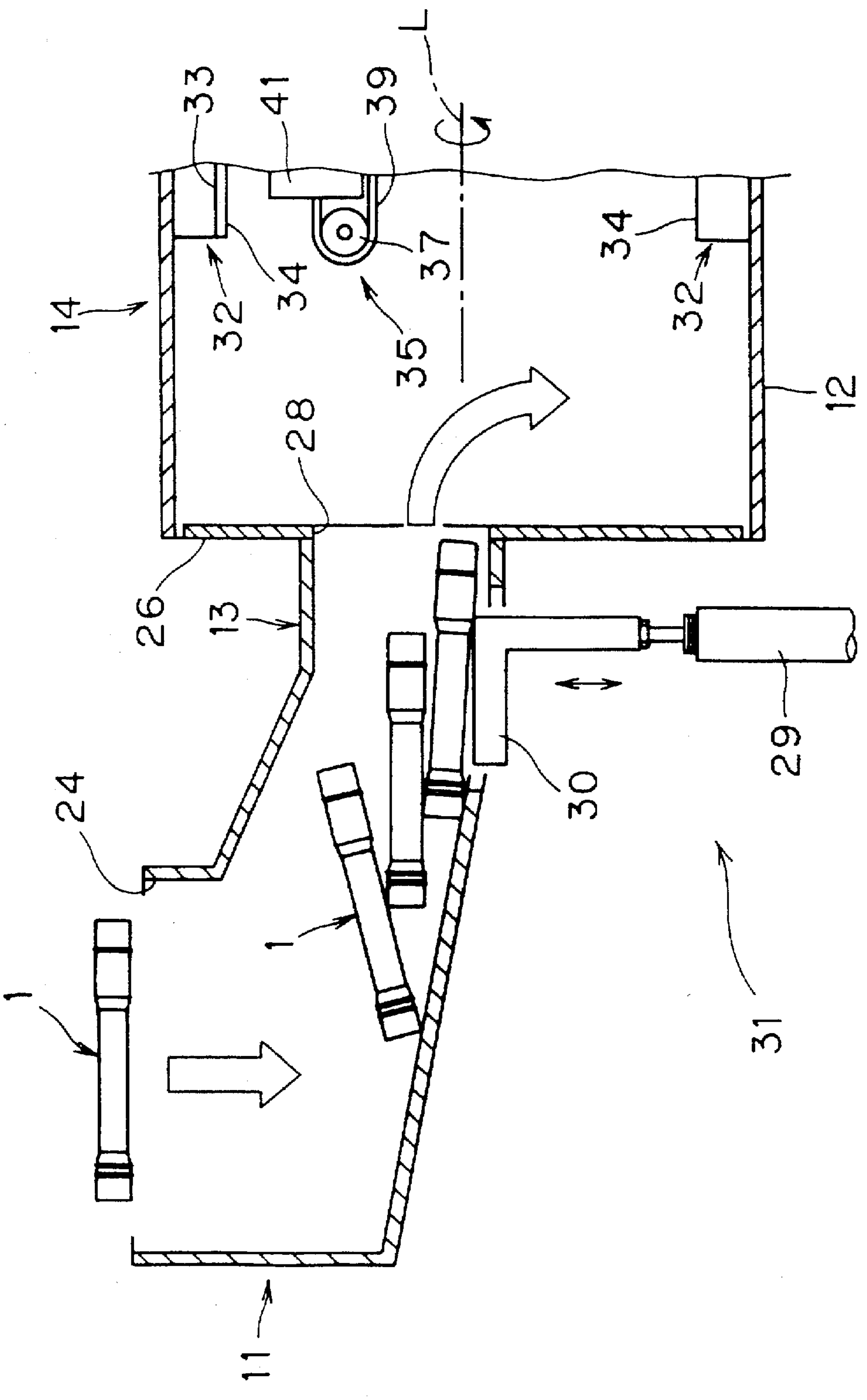
FIG. 1 is fragmentary sectional view of a preferred embodiment of the present invention.

A preferred embodiment of the present invention will now be described with reference to the drawings. Referring to FIGS. 1 to 5, an adapter feeding apparatus primarily comprises a hopper portion 11 into which adapters 1 are loaded at random, an inclined guide passage portion 13 for guiding the adapters 1 loaded in the hopper portion 11 into a drum element 12, an adapter delivery mechanism 14 for delivering the adapters 1 in the drum element 12 one by one, an adapter transport mechanism 15 for transporting the adapters 1 in a predetermined direction, a chute portion 16 for guiding the adapters 1 delivered from the adapter delivery mechanism 14 upstream of a transport direction of the adapter transport mechanism 15, and an adapter extraction and supply mechanism 17 provided downstream of the transport direction of the adapter transport mechanism 15.

Figure 6:
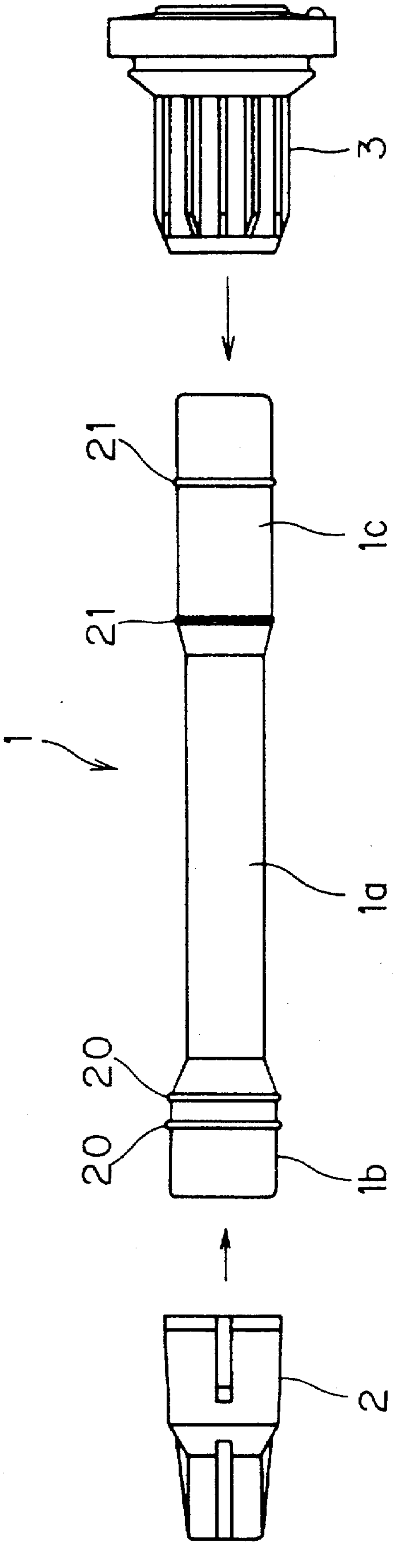
FIG. 6 is an exploded view of a plug joint.
Figure 7:
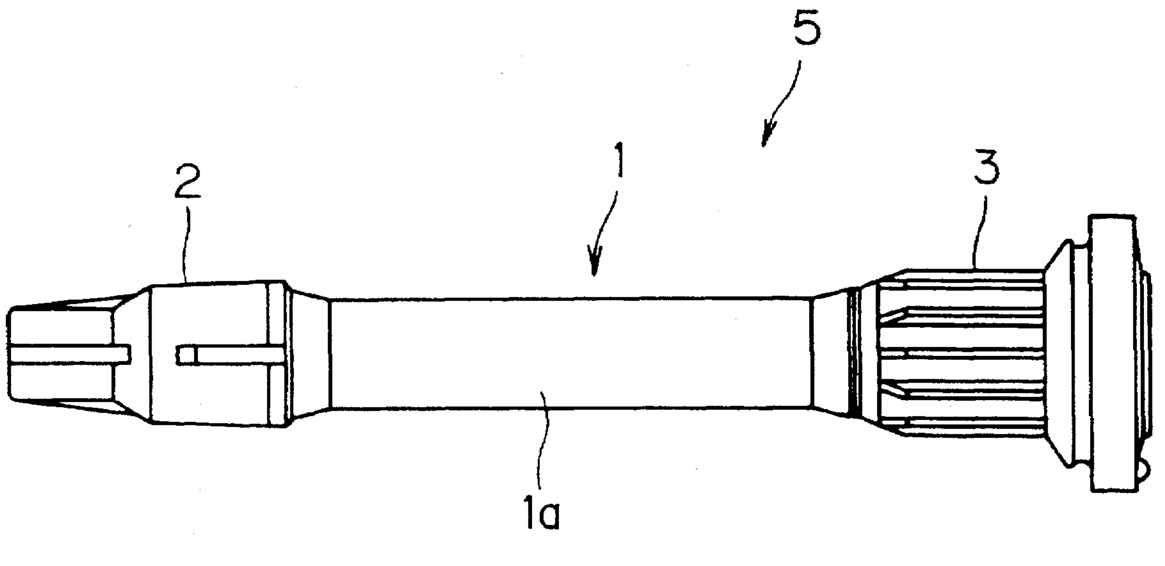
FIG. 7 is a view of an assembled plug joint.

Referring to FIG. 6, the adapter body **1*a* of the adapter 1 has the smallest outer diameter, and the bushing mounting portion 1*b* and cap mounting portion 1*c* on opposite ends of the adapter body 1*a* have outer diameters greater than the outer diameter of the adapter body 1*a*. The outer diameter of the bushing mounting portion 1*b* is greater than that of the cap mounting portion 1*c***.

The bushing mounting portion **1*b* and cap mounting portion 1*c* have circumferentially protruding annular positioning ribs 20 and 21 on the outer peripheral surfaces thereof for positioning the bushing element 2 and cap element 3 when mounted thereon, respectively. The outer diameter of the positioning ribs 20 on the bushing mounting portion 1*b* is greater than that of the positioning ribs 21 on the cap mounting portion 1*c*. The positioning ribs 20 on the bushing mounting portion 1*b*** have a diameter greater than that of any other portion to form a large-diameter locking portion.

As illustrated in FIG. 1, the hopper portion 11 has a top portion formed with an open adapter inlet 24, and a bottom portion in communication with the guide passage portion 13. The hopper portion 11 is large enough to accommodate about 400 adapters 1 at a time.

Figure 2:
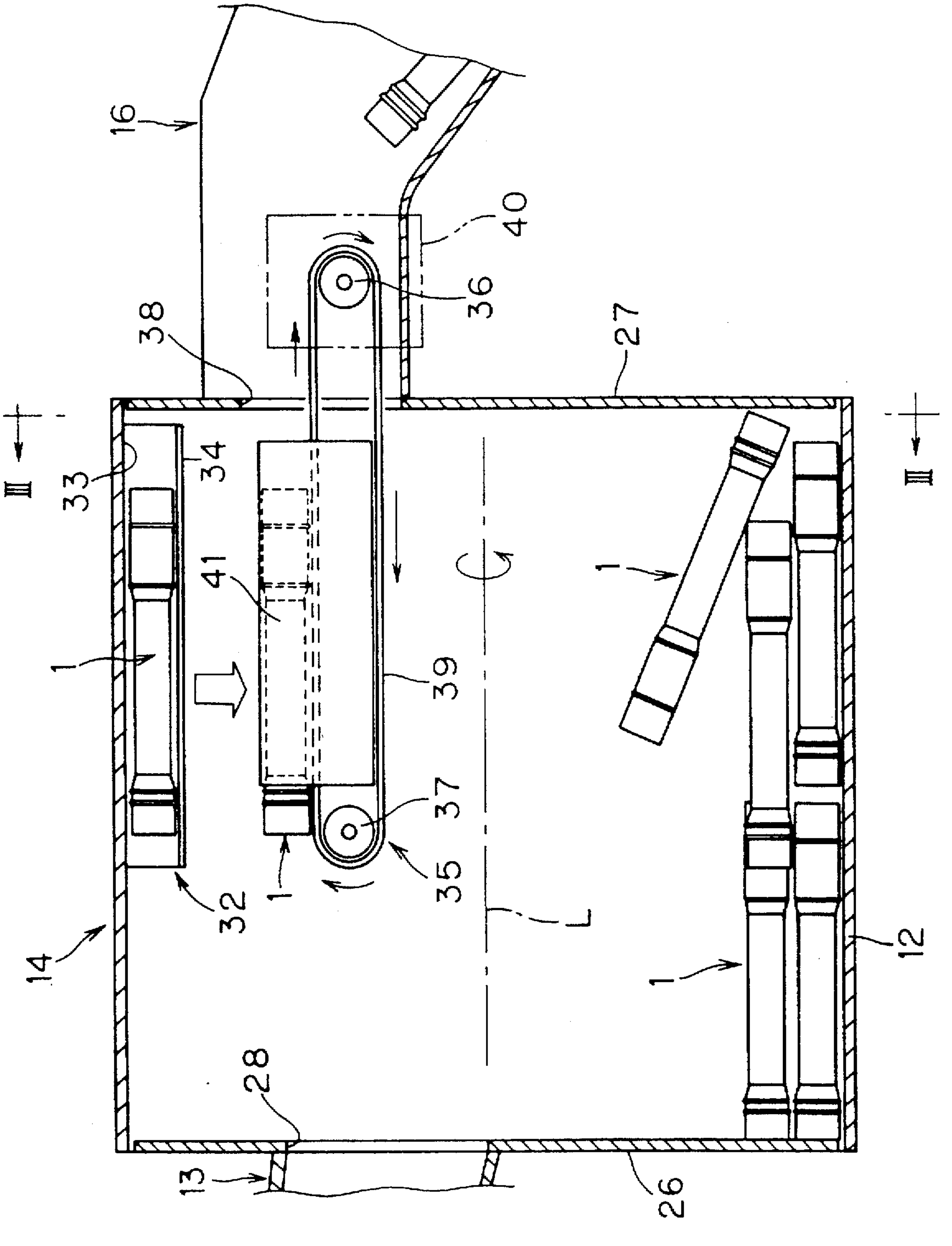
FIG. 2 is a fragmentary sectional view of the preferred embodiment of the present invention.
Figure 3:
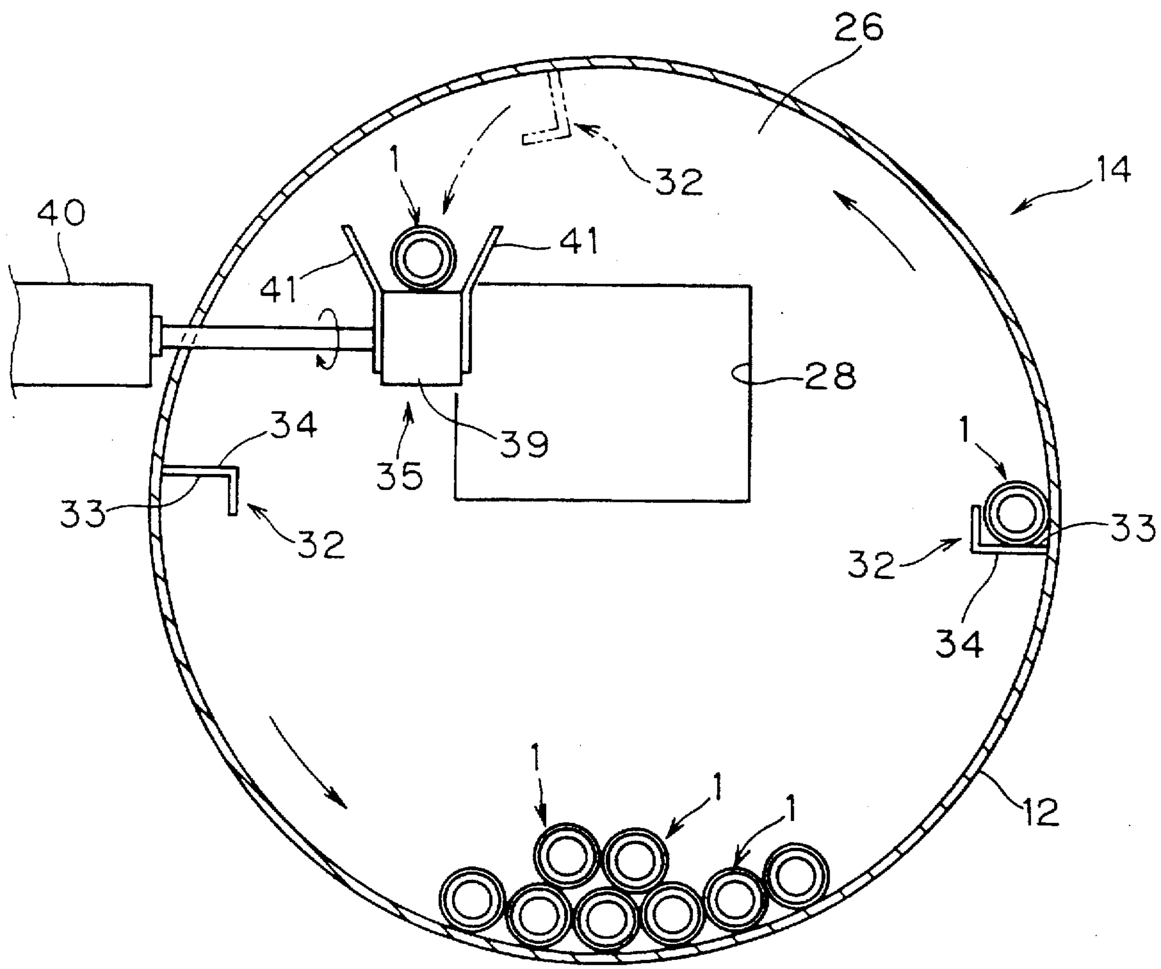
FIG. 3 is a sectional view taken along the line III—III of FIG. 2.

The drum element 12 is substantially tubular in configuration, as shown in FIGS. 1 to 3, and is supported at its outer peripheral surface by the apparatus body so that it is rotatable about a horizontal axis L but is not movable in the direction of the axis L. The drum element 12 is controlled by a driving mechanism not shown to be freely stopped and driven for rotation in a predetermined direction.

The drum element 12 has disc-shaped lid portions 26 and 27 for closing opposite ends of the drum element 12 in the direction of the axis L. The lid portions 26 and 27 are fixedly mounted and supported on the apparatus body.

An adapter guide opening 28 is formed in an upper portion of the lid portion 26 adjacent the guide passage portion 13. The interior of the drum element 12 is in communication with the guide passage portion 13 through the adapter guide opening 28.

At a location in the lower surface of the guide passage portion 13 is provided a feed amount adjusting mechanism 31 including a vertically movable adapter feed guide 30, and a cylinder 29 for vertically moving the adapter feed guide 30, as shown in FIG. 1. The adapter feed guide 30 is vertically moved up and down by actuation of the cylinder 29 to feed and guide the adapters 1 into the drum element 12. In this preferred embodiment, the cylinder 29 is actuated in response to an instruction from a sensor not shown for detecting the amount of adapters 1 received in the drum element 12, and the feed amount adjusting mechanism 31 adjusts the amount of adapters 1 fed to the drum element 12 to a value within a suitable range. This effectively prevents overload of rotation of the drum element 12 resulting from an excessive amount of adapters 1 received in the drum element 12.

Scoop-up portions 32 for scooping up the adapter 1 during the rotation of the drum element 12 about the axis L are provided on the inner peripheral surface of the drum element 12. A pair of scoop-up portions 32 are formed in circumferentially opposed positions in this preferred embodiment.

Each of the scoop-up portions 32 has a scoop-up tool 34 of an L-shaped cross-sectional configuration mounted by welding or the like on the inner peripheral surface of the drum element 12 to define an adapter retaining groove 33 elongated in the axial direction of the drum element 12 for receiving and holding one adapter 1.

The adapter retaining groove 33 of the scoop-up portion 32 has an open forward side in the direction of rotation of the drum element 12, and is adapted such that when the scoop-up portion 32 moves down from its top position, as shown in phantom lines in FIG. 3, the adapter 1 held in the adapter retaining groove 33 falls from the adapter retaining groove 33 by gravity.

A transport conveyor 35 for receiving the fallen adapter 1 to feed the adapter 1 to the chute portion 16 is provided in an upper position within the drum element corresponding to the position to which the adapter 1 falls by gravity from the scoop-up portion 32.

The transport conveyor 35 is inserted in the drum element 12 and fixedly mounted and supported on the apparatus body. The transport conveyor 35 primarily comprises a driving roller 36 provided outwardly of the drum element 12 adjacent the chute portion 16, a driven roller 37 provided within the drum element 12, an endless conveyor belt 39 looped around and mounted on the rollers 36 and 37 and extending through an adapter delivery opening 38 formed in an upper portion of the lid portion 27, and a motor 40 for driving the driving roller 36 for rotation in a predetermined direction.

Guide plates 41 are fixed on the apparatus body and serve as a guide portion gradually flared upwardly along the opposite sides of the conveyor belt 39 in a position corresponding to the adapter 1 for guiding the adapter 1 fallen from the scoop-up portion 32 to a predetermined position on the conveyor belt 39.

Figure 4:
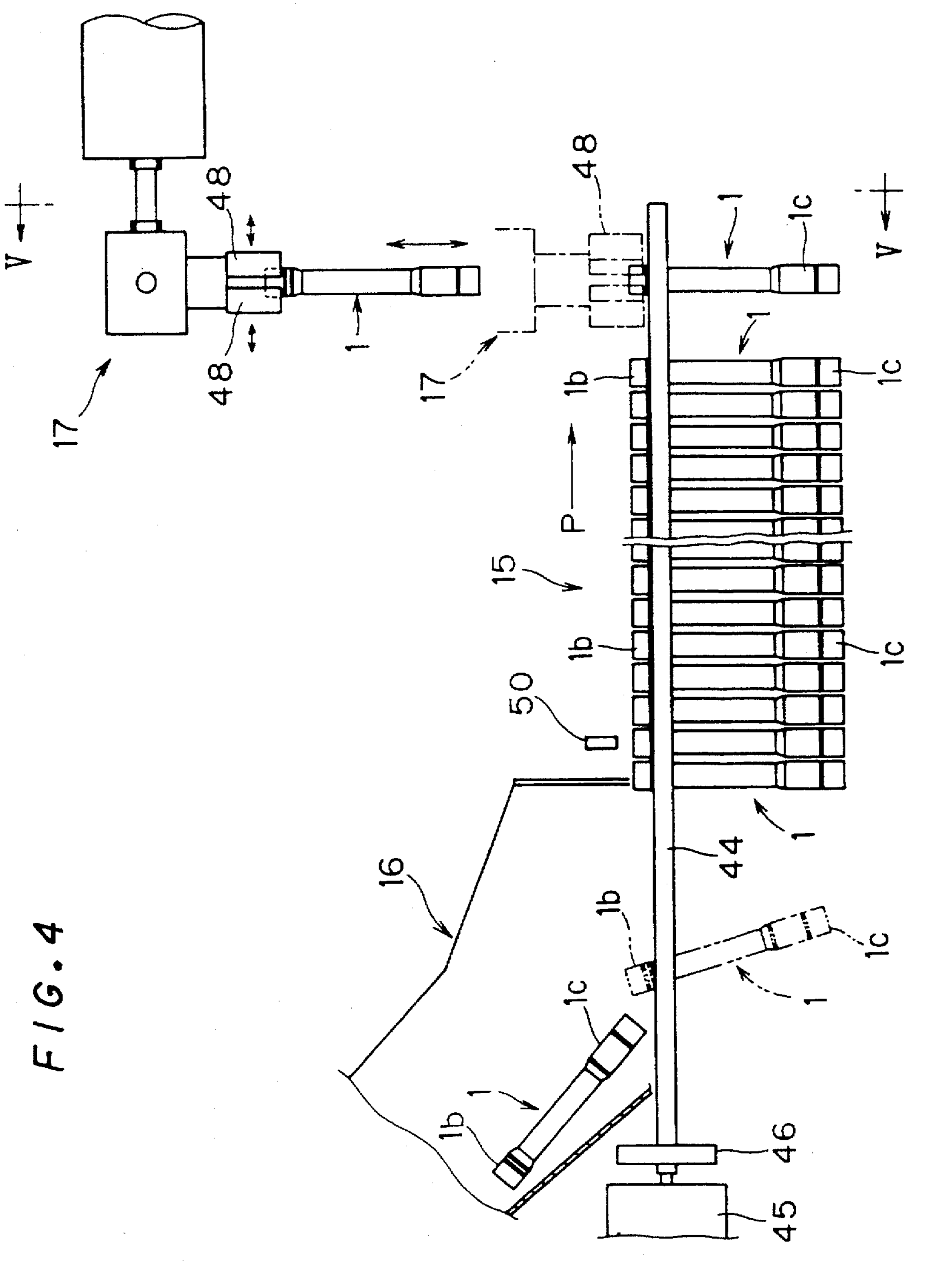
FIG. 4 is a fragmentary view of the preferred embodiment of the present invention.
Figure 5:
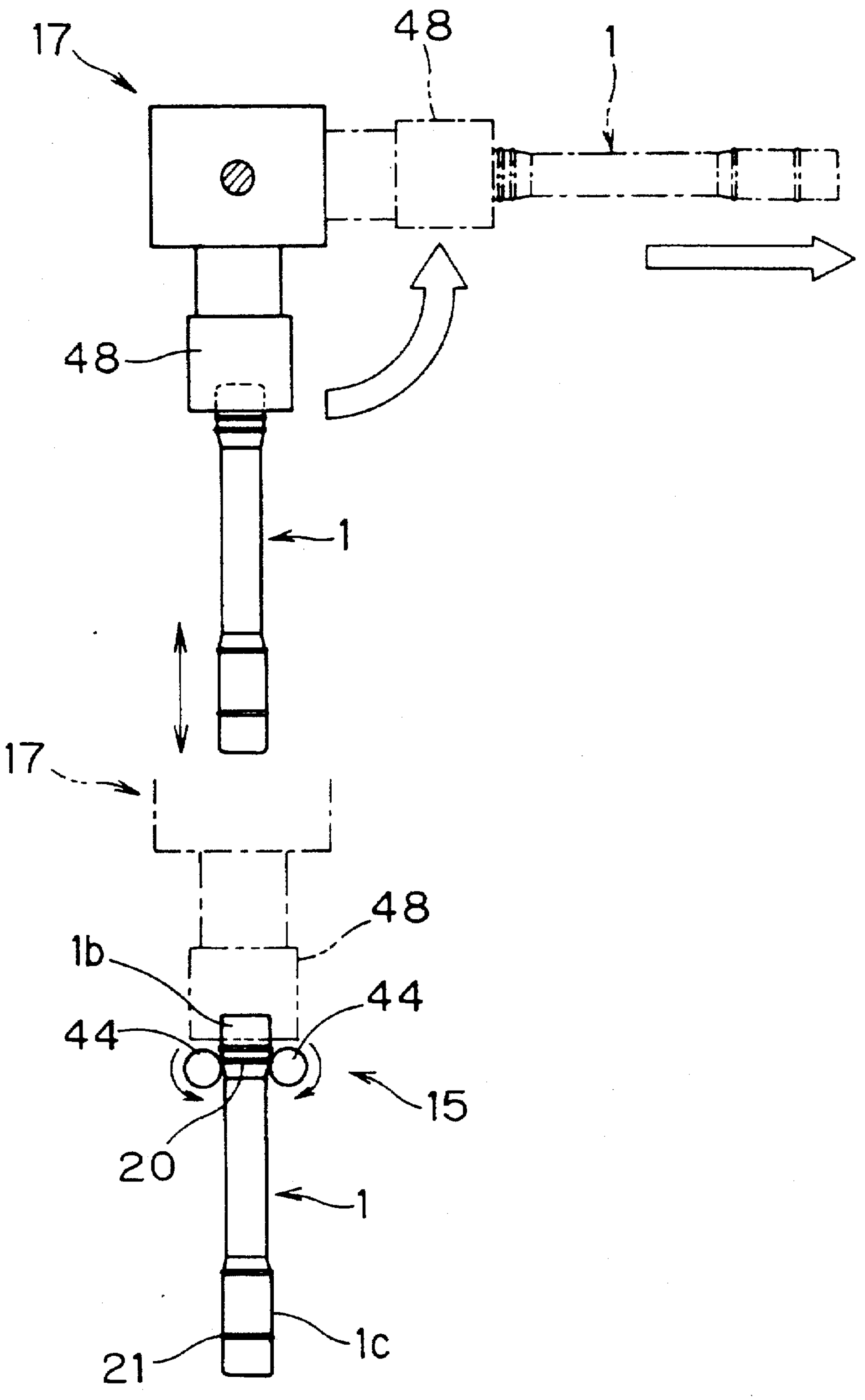
FIG. 5 is a sectional view taken along the line V—V of FIG. 4.

Referring to FIGS. 4 and 5, the adapter transport mechanism 15 includes a pair of spaced guide rails 44 having a circular outer peripheral surface and gradually downwardly inclined in the transport direction P. The spacing between the pair of guide rails 44 inhibits the passage of the positioning ribs 20 of the bushing mounting portion **1*b* serving as the large-diameter locking portion of the adapter 1 therethrough. The guide rails 44** are supported on the apparatus body for rotation about their axes.

When the adapter 1 is guided to the spacing between the guide rails 44, the cap mounting portion **1*c* and adapter body 1*a* of the adapter 1 pass through the spacing between the guide rails 44 downwardly, but the positioning ribs 20 on the bushing mounting portion 1*b* are locked in the spacing between the guide rails 44. Thus, the adapter 1 is held locked in the spacing between the pair of guide rails 44 by gravity in a vertical position, with the bushing mounting portion 1*b* and the cap mounting portion 1*c*** located respectively upside and downside.

A motor 45 serving as a driving portion is coupled through a motor transmitting mechanism 46 including a gear mechanism and the like to the upper end of the guide rails 44 located upstream of the transport direction P. As indicated by the arrows of FIG. 5, the motor 45 is driven to rotate the pair of guide rails 44 upwardly outwardly about their axes, respectively.

As illustrated in FIGS. 2 and 4, the chute portion 16 includes a guide plate in the form of a chute fixedly mounted and supported on the apparatus body for receiving the adapter 1 delivered from the transport conveyor 35 of the adapter delivery mechanism 14 to guide the adapter 1 slid down by gravity to a position over the spacing between the pair of guide rails 44 upstream of the transport direction P of the adapter transport mechanism 15.

The adapter extraction and supply mechanism 17, as shown in FIGS. 4 and 5, is provided over the pair of guide rails 44 downstream of the transport direction P of the adapter transport mechanism 15 and comprises a pair of openable and closable chucking elements 48 made of a synthetic resin for grasping the bushing mounting portion **1*b* of the adapter 1. The pair of chucking elements 48 are permitted to extend and retract in a predetermined direction by the extension and retraction of a piston shaft of a cylinder not shown. The chucking elements 48 and the cylinder are pivotable about an axis extending perpendicularly to the plane of FIG. 5**.

The opposed inner surfaces of the chucking elements 48 have respective arcuate retaining grooves corresponding to the bushing mounting portion **1*b***.

As the adapter 1 transported by the adapter transport mechanism 15 reaches a predetermined position downstream of the transport direction P when the chucking elements 48 are in an open, initial upper position indicated by the solid lines of FIG. 4, the cylinder is actuated to extend the piston shaft thereof, thereby moving the chucking elements 48 downwardly. After being moved a predetermined distance downwardly, the pair of chucking elements 48 are caused to provide access to each other to grasp the upper end portion, or the bushing mounting portion **1*b*, of the adapter 1**.

Then, the piston shaft is retracted by the actuation of the cylinder to move the pair of chucking elements 48 upwardly. The upward movement of the chucking elements 48 lifts the adapter 1 upwardly from between the pair of guide rails 44. The chucking elements 48 are pivoted 90° about the axis extending perpendicularly to the plane of FIG. 5 as shown in phantom lines in FIG. 5, and the adapter 1 assumes a horizontal position. In this state, the chucking elements 48 are moved horizontally. The piston shaft is extended by the actuation of the cylinder to feed the adapter 1 in the horizontal position to a predetermined position in the next process step.

Then, the chucking elements 48 are opened and returned to its initial position.

A suitable stopper mechanism is provided downstream of the transport direction P of the guide rails 44 in the adapter transport mechanism 15. The stopper mechanism is actuated to feed the single adapter 1 to an extraction position for the adapter extraction and supply mechanism 17.

At a suitable position upstream of the transport direction P of the pair of guide rails 44 is provided an adapter presence/absence check sensor 50 for detecting whether or not the adapter 1 is locked in the spacing between the pair of guide rails 44. If the adapter presence/absence check sensor 50 detects the adapter 1, the drum element 12 of the adapter delivery mechanism 14 stops rotating to stop the delivery of the adapter 1 to the adapter transport mechanism 15. If the adapter presence/absence check sensor 50 detects no adapter 1, the drum element 12 is driven for rotation to sequentially deliver the adapters 1 to the adapter transport mechanism 15. A suitable number of adapters 1 (e.g., about 30 adapters 1) are stocked in the spacing between the guide rails 44 so as to be arranged between a position downstream of the transport direction P and the detection position of the adapter presence/absence check sensor 50. This provides stable supply of the adapters 1 to the extraction position in the adapter transport mechanism 15 for the adapter extraction and supply mechanism 17.

The preferred embodiment of the present invention is constructed as above mentioned. An operator may simply load the multiplicity of adapters 1 into the hopper portion 11 at random. Then, a suitable number of adapters 1 may be fed into the drum element 12 by the vertical movement of the adapter feed guide 30 in the guide passage portion 13.

The drum element 12 rotates to rotate the scoop-up portions 32 on the inner peripheral surface of the drum element 12, permitting a single one of the adapters 1 fed into the drum element 12 to be scooped up by the scoop-up portion 32 as shown in FIG. 3.

Then, when the scoop-up portion 32 changes its movement from the upward movement to the downward movement, the adapter 1 falls by gravity from the adapter retaining groove 33 as shown in phantom lines in FIG. 3 and is then placed on the conveyor belt 39 of the transport conveyor 35 under the guidance of the guide plates 41.

The conveyor belt 39 moves around in a predetermined direction. The adapter 1 on the conveyor belt 39 is transported toward the chute portion 16 as the conveyor belt 39 moves around. The adapter 1 transported to the chute portion 16 falls from the end of the conveyor belt 39 onto the chute portion 16 and is then guided along the inclination of the chute portion 16 to the position over the spacing between the guide rails 44 upstream of the transport direction P of the adapter transport mechanism 15.

As the adapter 1 is guided to the position over the spacing between the guide rails 44, the adapter body 1*a* and the cap mounting portion 1*c* pass through the spacing between the guide rails 44 downwardly, and the positioning ribs 20 on the bushing mounting portion 1*b* are locked in the spacing between the guide rails 44. Then, the adapter 1 is held locked in the spacing between the guide rails 44 in the vertical position, with the bushing mounting portion 1*b* located upside, and is then transported in the downwardly inclined direction, or the transport direction P. Likewise, the respective adapters 1 are sequentially transported in the same vertical position.

The pair of guide rails 44 rotating upwardly outwardly may effectively prevent the stream of adapters 1 from being jammed due to the resistance of the adapters 1 and effectively prevent the positioning ribs 20 from being caught between the guide rails 44 and cracked.

The adapter 1 transported to the extraction position downstream of the transport direction P of the guide rails 44 is grasped by the chucking elements 48 of the adapter extraction and supply mechanism 17, extracted from between the guide rails 44, and then fed in the horizontal position to the next process step.

As above described, the operator should simply load the adapters 1 into the hopper portion 11 at random without concern for the position of the adapters 1. The adapter transport mechanism 15 automatically places the adapters 1 into the predetermined vertical position independently of the orientation of the adapters 1 delivered from the adapter delivery mechanism 14. The adapter extraction and supply mechanism 17 sequentially extracts the adapters 1 oriented in the predetermined vertical position and automatically feeds the adapters 1 to the next process step. Therefore, the adapters 1 in the predetermined position may be fed to the next process step at a stable and constant pace without the operator.

Since the adapter delivery mechanism 14 delivers the adapters 1 one by one to the chute portion 16, the adapters 1 are effectively prevented from being jammed upstream of the transport direction P of the guide rails 44.

The guide plates 41 provided on the transport conveyor 35 may satisfactorily guide the adapters 1 fallen by gravity from the scoop-up portion 32 onto the conveyor belt 39, stabilizing the delivery of the adapters 1 by the transport conveyor 35.

In the above described preferred embodiment, the positioning ribs 20 on the bushing mounting portion 1*b* serve as the large-diameter locking portion. However, the positioning ribs 21 on the cap mounting portion 1*c* may function as the large-diameter locking portion.

While the invention has been described in detail, the foregoing description is in all aspects illustrative and not restrictive. It is understood that numerous other modifications and variations can be devised without departing form the scope of the invention.

We claim:

1. An adapter feeding apparatus for sequentially feeding tubular adapters to a next process step, each of said adapters including at its first end a bushing mounting portion to which a bushing element is mounted, and at its second end a cap mounting portion to which a cap element is mounted, one of said bushing mounting portion and said cap mounting portion including a large-diameter locking portion having a diameter greater than that of other portions of said adapters, said adapter feeding apparatus comprising:

a hopper portion for receiving said adapters;

a guide passage portion for guiding said adapters received in said hopper portion into a drum element, a carrier adapted to transport said tubular adapters to said next process step;

a feed amount adjusting mechanism provided at a location in a lower surface of said guide passage portion for adjusting the amount of said adapters to be fed into said drum element, an adapter delivery mechanism having said drum element supported for rotation about a horizontal axis, said adapter delivery mechanism for delivering said adapters in said drum element one by one by the rotation of said drum element;

an adapter transport mechanism including a pair of guide rails having a circular outer peripheral surface and inclined downwardly in a transport direction, said guide rails being spaced to inhibit the passage of said large-diameter locking portion therethrough, and a driving portion for rotating said pair of guide rails upwardly outwardly about their axes;

a chute portion for guiding said adapters delivered from said adapter delivery mechanism to the spacing between said pair of guide rails upstream of the transport direction of said adapter transport mechanism; and an adapter extraction and supply mechanism provided downstream of the transport direction of said guide rails for extracting said adapters sequentially transported, with said large-diameter locking portion of each of said adapters locked in the spacing between said guide rails, one by one to feed said adapters to the next process step.

2. The adapter feeding apparatus of claim 1, wherein said drum element includes a scoop-up portion formed on an inner peripheral surface of said drum element for scooping up a single one of said adapters when said drum element rotates about its axis to permit said single adapter to fall by gravity at an upper position, said adapter feeding apparatus further comprising:

a transport conveyor for receiving said fallen adapter to feed said fallen adapter to said chute portion.

3. The adapter feeding apparatus of claim 2, wherein said scoop-up portion includes a scoop-up tool of an L-shaped cross-sectional configuration mounted on the inner peripheral surface of said drum element to define an adapter retaining groove elongated in the axial direction of said drum element for receiving and holding said single adapter.

4. The adapter feeding apparatus of claim 2, wherein said transport conveyor includes a guide portion for guiding said adapter fallen from said scoop-up portion onto a conveyor belt of said transport conveyor.

5. The adapter feeding apparatus of claim 3, wherein said transport conveyor includes a guide portion for guiding said adapter fallen from said scoop-up portion onto a conveyor belt of said transport conveyor.

6. The adapter feeding apparatus of claim 1, wherein said feed amount adjusting mechanism includes a vertically movable adapter feed guide disposed in the lower surface of said guide passage portion, and a cylinder for vertically moving said adapter feed guide.

* * * * *